US008892576B2

(12) United States Patent
Krleza

(10) Patent No.: US 8,892,576 B2
(45) Date of Patent: Nov. 18, 2014

(54) ORDERING AND PRESENTING A SET OF DATA TUPLES

(71) Applicant: International Business Machines Corporation, Armonk, NY (US)

(72) Inventor: Dalibor Krleza, Ludbreg (HR)

(73) Assignee: International Business Machines Corporation, Armonk, NY (US)

(*) Notice: Subject to any disclaimer, the term of this patent is extended or adjusted under 35 U.S.C. 154(b) by 85 days.

(21) Appl. No.: 13/661,236

(22) Filed: Oct. 26, 2012

(65) Prior Publication Data

US 2014/0123055 A1  May 1, 2014

(51) Int. Cl.
  *G06F 17/30* (2006.01)

(52) U.S. Cl.
  USPC .......................................... 707/752; 707/748

(58) Field of Classification Search
  USPC .................................. 707/752, 748
  See application file for complete search history.

(56) References Cited

U.S. PATENT DOCUMENTS

| | | | |
|---|---|---|---|
| 6,192,373 B1 * | 2/2001 | Haegele | 1/1 |
| 6,484,166 B1 * | 11/2002 | Maynard | 707/694 |
| 7,191,171 B2 * | 3/2007 | Lin | 707/722 |
| 7,801,878 B2 | 9/2010 | Hayes et al. | |
| 7,882,114 B2 * | 2/2011 | Furusho | 707/752 |
| 7,885,964 B2 * | 2/2011 | Murray | 707/752 |
| 7,895,216 B2 * | 2/2011 | Longshaw et al. | 707/752 |
| 8,027,985 B2 * | 9/2011 | Dettinger et al. | 707/752 |
| 8,051,102 B2 * | 11/2011 | Everett | 707/793 |
| 8,325,371 B2 * | 12/2012 | Oshima | 358/1.15 |
| 8,380,704 B1 * | 2/2013 | Fuller | 707/721 |
| 2002/0133488 A1 * | 9/2002 | Bellis et al. | 707/6 |
| 2005/0204385 A1 * | 9/2005 | Sull et al. | 725/45 |
| 2009/0006459 A1 * | 1/2009 | Parks et al. | 707/102 |

* cited by examiner

*Primary Examiner* — Leslie Wong
(74) *Attorney, Agent, or Firm* — Schmeiser, Olsen & Watts; John Pivnichny

(57) ABSTRACT

An approach for managing a set of data tuples is provided. A search tuple is received and a comparison relation is determined. The set of data tuples is ordered based on the comparison relation. A placement of the search tuple is determined between two consecutive data tuples in the ordered set of data tuples so that the search tuple is ordered among the ordered set of data tuples in accordance with the comparison relation. A presentation is generated based on the placement of the search tuple between the two consecutive data tuples. The presentation includes a sequence of data tuples included in the ordered set of data tuples. The sequence includes the two consecutive data tuples and the search tuple between the two consecutive data tuples.

21 Claims, 11 Drawing Sheets

| ID | Name | Surname | Birth date | Height | Weight |
|----|------|---------|------------|--------|--------|
| 1 | Albert | Albertić | 01.01.1960 | 140 | 20.12 |
| 2 | Adalbert | Čanaki | 05.04.2003 | 175 | 25.43 |
| 3 | Bero | Hajduk | 15.10.1995 | 154 | 21.65 |
| 4 | Crnko | Vargović | 20.07.1997 | 163 | 24.01 |
| 5 | Ivan | Filipašić | 20.10.1995 | 161 | 24.23 |
| 6 | Alberto | Kovač | 23.03.1996 | 151 | 23.33 |
| 7 | Darije | Ramljak | 03.10.1975 | 201 | 34.23 |
| 8 | Hrvoje | Kegalj | 07.03.1976 | 186 | 10.23 |

*FIG. 4A*

| ID | Name | Surname | Birth date | Height | Weight |
|---|---|---|---|---|---|
| 2 | Adalbert | Čanaki | 05.04.2003 | 175 | 25.43 |
| 1 | Albert | Albertić | 01.01.1960 | 140 | 20.12 |
| 6 | Alberto | Kovač | 23.03.1996 | 151 | 23.33 |
| 3 | Bero | Hajduk | 15.10.1995 | 154 | 21.65 |
| 4 | Crnko | Vargović | 20.07.1997 | 163 | 24.01 |
| 19 | Damir | Špikić | 23.07.1970 | 195 | 30.09 |
| 18 | Daniel | Šimić | 28.04.1975 | 185 | 45.55 |
| 7 | Darije | Ramljak | 03.10.1975 | 201 | 34.23 |

FIG. 4B

| ID | Name | Surname | Birth date | Height | Weight |
|---|---|---|---|---|---|
| 2 | Adalbert | Čanaki | 05.04.2003 | 175 | 25.43 |
| 1 | Albert | Albertić | 01.01.1960 | 140 | 20.12 |
| 6 | Alberto | Kovač | 23.03.1996 | 151 | 23.33 |
| 3 | Bero | Hajduk | 15.10.1995 | 154 | 21.65 |
| 4 | Crnko | Vargović | 20.07.1997 | 163 | 24.01 |
| | Da | | | | |
| 19 | Damir | Špikić | 23.07.1970 | 195 | 30.09 |
| 18 | Daniel | Šimić | 28.04.1975 | 185 | 45.55 |
| 7 | Darije | Ramljak | 03.10.1975 | 201 | 34.23 |
| 21 | Dragica | Veliković | 25.07.1956 | 159 | 23.33 |
| 8 | Hrvoje | Kegalj | 07.03.1976 | 186 | 10.23 |
| 9 | Hrvoje | Vulin | 23.11.1972 | 176 | 55.65 |
| 11 | Irena | Kezić | 24.04.1981 | 163 | 44.11 |
| 5 | Ivan | Filipašić | 20.10.1995 | 161 | 24.23 |

*FIG. 4C*

ORDERING AND PRESENTING A SET OF DATA TUPLES

TECHNICAL FIELD

The present invention relates to a data processing method and system for managing a data set, and more particularly to a technique for ordering and presenting a search tuple among ordered data tuples from a data set.

BACKGROUND

A user interface providing a known search of a data set includes a filter form and a paginated table. The user enters values on the filter form, which is either predefined or dynamic (i.e., governed by rules). The user makes a selection to initiate the search of the data set by transforming the values entered on the filter form into a SQL query and executing the query in a database. The database returns the results of the search, which includes data that matches the query. Results of the search are displayed in the paginated table. The returned data is a subset of the entire data set (i.e., all the data present in the database on which the filter form may be applied). The execution of the SQL query selects subsets of data from a data set under strict conditions that may not fit how a human thinks about a search for data from the data set. The strict conditions enforced by known search approaches leads to searching iterations; i.e., a user repeatedly updates search conditions in the filter form and re-executes the query until the user's desired result is found.

SUMMARY

In a first embodiment, the present invention provides a method of managing a set of data tuples. The method includes a computer receiving a search tuple including k elements, where k is an integer and k≥1. The method further includes the computer determining a comparison relation specifying an ordering of tuples. Each tuple includes k elements. The method further includes the computer ordering the set of data tuples by using the comparison relation and based on value(s) of k elements included in each data tuple and corresponding to the k elements included in the received search tuple. The method further includes, based on the comparison relation, the computer determining a placement of the search tuple between two consecutive data tuples in the ordered set of data tuples, so that the search tuple is ordered among the ordered set of data tuples in accordance with the comparison relation. The method further includes, based on the placement of the search tuple between the two consecutive data tuples so that the search tuple is ordered among the ordered set of data tuples in accordance with the comparison relation, the computer generating a presentation of the search tuple among a sequence of data tuples included in the ordered set of data tuples. The sequence includes at least the two consecutive data tuples.

A system, program product and a process for supporting computing infrastructure where the process provides at least one support service are also described and claimed herein, where the system, program product and process for supporting computing infrastructure correspond to the aforementioned method.

Embodiments of the present invention provide a user interface component that enables users to perform a more natural and fuzzy search of a structured data set, and generate a display of the user interface component among an ordered version of the structured data set resulting from the search. The user can see the data tuples in the ordered data set that are closest to the user's search query, even if an exact match is not found, and without regard to a threshold degree of closeness of the data tuples to the values in the search query. In one embodiment, the data tuples are displayed in tables in a user interface component, where the height of the tables remains consistent so that there are never multiple pages of data tuples. By avoiding multiple pages of data tuples and by keeping the height of the tables consistent, the user interface component is well-suited to mobile applications.

BRIEF DESCRIPTION OF THE DRAWINGS

FIG. 4A is an exemplary presentation of a UI component that includes data tuples prior to the presentation of data tuples generated, displayed and managed in the process of FIG. 2, in accordance with embodiments of the present invention.

FIG. 4B is an exemplary presentation of the UI component of FIG. 4A, where the data tuples in FIG. 4A are re-ordered based on a user selection of a header cell, in accordance with embodiments of the present invention.

FIG. 4C is an exemplary presentation of a search tuple within a sequence of data tuples included in an ordered set of data tuples, where the presentation is generated, displayed and managed in the process of FIG. 2, and where the placement of the search tuple is based on a value in the search tuple, in accordance with embodiments of the present invention.

DETAILED DESCRIPTION

Overview

Embodiments of the present invention provide a complex user interface (UI) component, using a specific data source, that enables users to perform natural and fuzzy searches of a structured data set, where the data set can be ordered and queried. The UI component may combine a search form together with search result tables into a single component. Value(s) entered by a user into a search tuple in the search form automatically orders all of the data tuples in the structured data set. The UI component displays, in order, the search tuple along with data tuples from the ordered data set that most closely match the search tuple. The UI component is not limited to a subset of the data set that is strictly defined by matching values of data tuples to values of the search tuple; instead, the UI component displays data tuples that are negative as compared to the search tuple, and displays other data tuples that are positive as compared to the search tuple, taking into consideration how the data set is currently ordered. The data tuples are displayed in the UI component even if an exact match to the search tuple is not found, and without requiring any threshold degree of closeness to the search tuple. Embodiments of the present invention may allow the UI component to perform a closest match search on large data pools and structured data streams, while allowing the user to avoid searching iterations that include updating search conditions in a filter form in a traditional approach.

System for Managing a Set of Data Tuples

Figure 1:
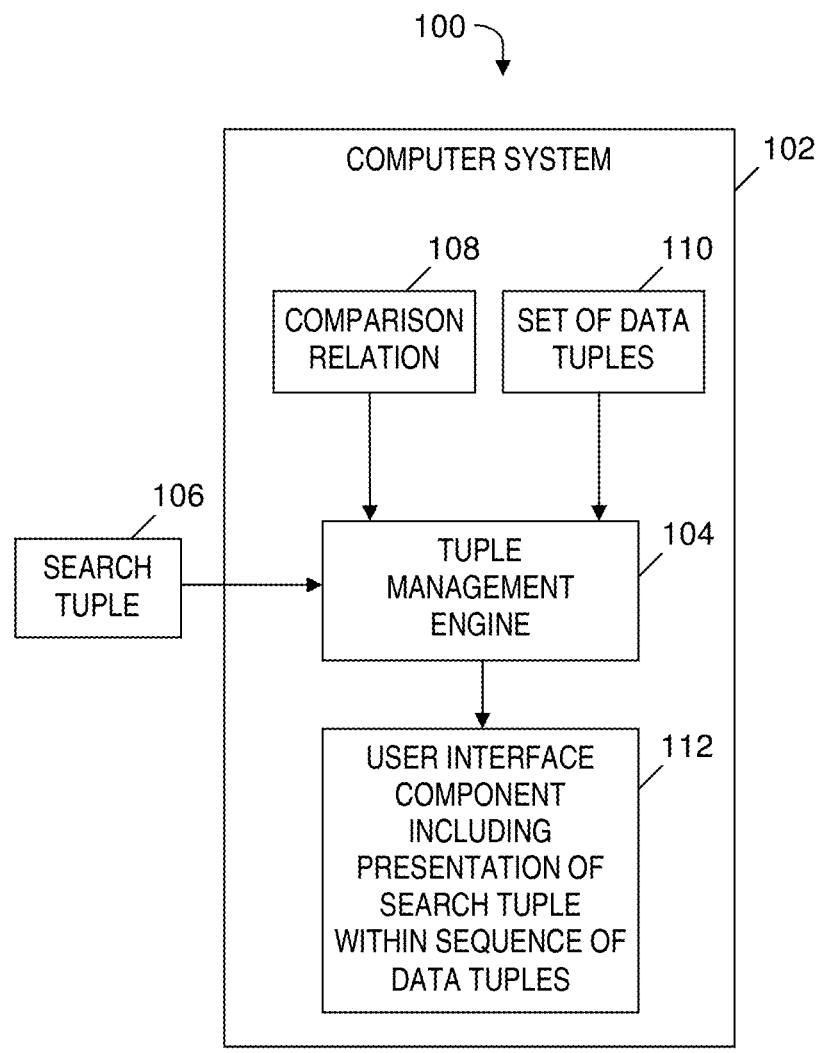
FIG. 1 is a block diagram of a system for managing a set of data tuples, in accordance with embodiments of the present invention.

FIG. 1 is a block diagram of a system for managing a set of data tuples, in accordance with embodiments of the present invention. System 100 includes a computer system 102 that runs a software-based tuple management engine 104. Tuple management engine 104 receives a search tuple 106 entered by a user. Tuple management engine receives or determines a comparison relation 108 that specifies how to order data tuples in a set of data tuples 110. The source of or interface to the set of data tuples 110 is referred to herein as the data source. The set of data tuples 110 is stored in a data repository referred to herein as a data store.

Tuple management engine 104 orders the set of data tuples 110 according to the comparison relation 108. In one embodiment, tuple management engine 104 determines a placement of search tuple 106 in the ordered set of data tuples 110 so that the search tuple 106 and the ordered set of data tuples 110 are in an order specified by the comparison relation 108. Using the placement of the search tuple 106, tuple management engine 104 generates a UI component 112 that includes a presentation of the search tuple placed within a sequence of at least some of the ordered data tuples included in the ordered set of data tuples 110.

In one embodiment, the UI component 112 includes the following parts:

1. Ruler (also known as (a.k.a.) ruler table): includes a header, search form, controls and informational indicators.

2. Negative table: a table displayed above the ruler in the UI component 112, where each row of the table includes value(s) of a corresponding data tuple included in the set of data tuples 110. The columns of the negative table are associated with domains in the data source, in a one-to-one correspondence. The negative table includes negative information compared to the value(s) that are currently present in the search form in the ruler. Negative information indicates that value(s) in each row of the negative table are less than corresponding value(s) that are currently present in the search form in the ruler.

3. Positive table: a table displayed below the ruler in the UI component 112, where each row of the table includes value(s) of a corresponding data tuple included in the set of data tuples 110. The columns of the positive table are associated with domains in the data source, in a one-to-one correspondence. The positive table includes positive and equal information compared to the value(s) that are currently present in the search form in the ruler. Positive and equal information indicates that value(s) in each row of the positive table are greater than or equal to corresponding value(s) that are currently present in the search form in the ruler.

In the special case in which the search tuple 106 is a 0-tuple, the negative table does not include data tuples in any of its rows (i.e., its rows are empty), whereas the positive table includes data tuples in rows, as long as the data source includes at least some data.

In one embodiment, the negative and positive tables include the same number of rows, where the number of rows is denoted as depth. That is, both the negative and positive tables include depth rows. Having the same number of rows in the negative and positive tables simplifies the implementation because fewer parameters are passed to the data source and there is no need for different caches with different sizes. If the search tuple 106 includes values that order the set of data tuples 110 in such a way that there is less than depth data tuples in the data source on the negative or on the positive side of the ruler, then the table (i.e., negative or positive table) that has less than depth data tuples is not filled in completely, thereby including one or more empty rows in which there is no data. Unless the data source is empty, there must be at least one data tuple in one row next to the ruler, either on the negative or on the positive side of the ruler.

The header, search form and controls included in the ruler are described below.

Header:

The header consists of header cells. Each header cell includes a name of a domain and is selectable by a user (e.g., by clicking or another action) to generate an ordering of the set of data tuples 110. The user "manually" chooses an ordering of the set of data tuples 110 only if the search form is empty (e.g., the search tuple is a 0-tuple). The "manual" ordering of the set of data tuples 110 is based on data in the domain indicated by a user selection of a header cell. If the search form is filled in by the user with at least one value and the search tuple exists, then the ordering of the set of data tuples 110 is determined automatically based on the filled in value(s) in the search form and the comparison relation 108. The order in which the search form values are filled in by the user matches the order of the search tuple elements used by the comparison relation 108. In one embodiment, the header cell(s) selected to determine the ordering include corresponding indicator(s), where different indicators distinguish between the "manual" ordering the set of data tuples 110 when the search form is empty and automatic ordering of the set of data tuples 110 based on value(s) entered in the search form.

Search Form:

The search form includes entry fields labeled by the corresponding header cell, where each entry field can receive a value from a user to define and determine a search on the set of data tuples 110 in the data source. Input controls for each domain in the data source determine the type of data that can be entered in each entry field in the search form. As the user enters value(s) in the search form, the search tuple 106 is defined. Elements of the search tuple are ordered in the same order in which the values are entered in the search form.

The search form is sensitive to user changes, so that every change to a value in the search form (e.g., keystrokes on strings and value changes on other data types) is reflected in the search tuple and the search action or data fetch is initiated without a substantial delay. A search action or data fetch is made on the data source to order the data source according to the search tuple 106. Finding a placement within the ordered data source at which the search tuple belongs is based on the order of data in the data source.

Controls:

The controls allow a user to perform operations on the UI component 112. The controls are user-selectable buttons or other graphical user interface (GUI) elements that, when selected, may perform one or more of the following actions:

(1) Move Data Tuples Down:

Activating the move data tuples down control pushes the search tuple 106 in a negative direction (i.e., towards the data tuples that are less than the search tuple 106), so that d data tuples in the negative table move from the negative table to the positive table, the d most positive data tuples in the positive table are removed from UI component 112, and the next d data tuples that follow the most negative data tuple in the negative table are fetched from the ordered set of data tuples 116 and added to the negative table. If there are less than d data tuples in the ordered set of data tuples 110 that follow the most negative data tuple currently in the negative table, then the remaining (i.e., less than d) data tuples in the ordered set of data tuples 110 are added to the negative table.

(2) Move Data Tuples Up:

Activating the move data tuples up control pushes the search tuple 106 in a positive direction (i.e., towards the data tuples that are greater than or equal to the search tuple 106), so that d data tuples in the positive table move from the positive table to the negative table, the d most negative data tuples in the negative table are removed from UI component 112, and the next d data tuples that follow the most positive data tuple in the positive table are fetched from the ordered set of data tuples 116 and added to the positive table. If there are less than d data tuples in the ordered set of data tuples 110 that follow the most positive data tuple currently in the positive table, then the remaining (i.e., less than d) data tuples in the ordered set of data tuples 110 are added to the positive table.

(3) Return to Offset 0:

While using the move data tuples up and/or move data tuples down controls, the user changes the offset of data displayed in the positive and negative tables as compared to the content of the search tuple 106. Activating the return to offset 0 control clears the current offset and returns the search tuple 106 to its original position in the ordered set of data tuples 110, as determined by the comparison relation 108. For example, if the user activates the move data tuples up control so that the search tuple 106 is pushed from its original position 6 places in the positive direction, then the offset changes from 0 to 6. If the user then activates the return to offset 0 control, then the search tuple 106 is returned to its original position and the offset is changed from 6 to 0. In one embodiment, the offset is displayed on the ruler.

(4) Clear Search Form:

Activating the clear search form control clears the search form and the search tuple so that all the entry fields in the search form are empty.

In one embodiment, other options and features that are included in the UI component 112 include:

Events on Negative and Positive Tables:

In one embodiment, the negative and positive tables include events that allow user actions on a particular row in the negative or positive table to be propagated for further processing.

Display of Errors:

If a search action or data fetch from the set of data tuples 110 results in an error, then the error is displayed on the ruler, indicating the type of problem to the user (i.e., problem in communication with the data source or the data source itself encountered an error).

Display of Warnings:

If a search action or data fetch from the set of data tuples 110 results in a specific case that warrants a warning, then a warning is displayed on the ruler, indicating to the user that the data source encountered a problem of a kind defined by the specific case. For example, if the data source is empty, a warning is displayed.

Other features of the UI component 112 are optional and may include:

No Scroll Bars are Needed, Especially Vertical Scroll Bars:

The purpose of UI component 112 is providing a specific kind of search on large data pools or streams. One of the innovative features is that UI component 112 is not aware of its current position in the underlying data source. Also, the UI component 112 does not need to show any kind of positioning other than the offset, as discussed above.

Caching:

Implementation of UI component 112 provides a caching mechanism. The initial data fetch from the data source, or a subsequent search action or data fetch from the data source attempts to provide 2*depth rows in both the positive and negative tables, or in a single direction if the UI component 112 specifically asks for rows in a single direction. Moving data tuples up or down may deplete the cache in a particular direction. In response to lacking sufficient data in the cache in one direction (i.e., negative or positive), then tuple management engine 104 initiates an additional data fetch from the data source to obtain more data for the one direction. Obtained data is added to the cache and displayed if needed. If one of the tables (i.e., positive table or negative table) is empty (i.e., including only empty rows), every user action that tries to move data further in the direction of the empty table initiates an additional data fetch from the data source. If the additional data fetch from the data source does not result in obtaining more data for the direction of the move, then UI component 112 ensures that there is at least one populated row next to the ruler, unless the data source is completely empty. The caching mechanism is tightly coupled with how the data source works with data.

If the source of data is a database, then the data source implementation avoids retrieving a large amount of data from the database, and uses an optimized search on the database by using techniques offered by the database, in order to make the search fast and consume the least possible amount of resources.

Styling:

UI component 112 is implemented in a way that allows developers and designers to define styling which seamlessly fits the UI component 112 into a larger graphical user interface.

UI Component Preferences:

The preferences of the UI component 112 are presented below:

Depth: an integer that defines the number of rows in the negative table and the number of rows in the positive table. In one embodiment, each table has exactly depth rows. The rows that do not include data are empty rows, but are still present in the table, thereby preserving a consistent height of the UI component 112.

Structure: The structure that uniquely defines the domains of the data source, columns of both the negative and positive tables, header cells and the search form. The structure defines the number of fields, field id, field displaying the name in each header cell, field type for input control in the search form, formatting strings in case values can be formatted, and basic styling of each cell and input control for a particular field.

Initial order of data in data source: The initial user-defined order of data in the data source is active and displayed after the UI component 112 is created. This preference is valid only if the initial search tuple is not defined (e.g., the UI component data source is ordered manually, not automatically).

Initial search tuple: The initial values for a search form that trigger the automatic ordering of the underlying data source.

Data source: the source of data for populating the negative and positive tables in UI component 112. The data source matches the structure supplied for the UI component 112.

UI Component Events:

The UI component 112 has a number of events, which are listed below:

onSearchValueChange: triggered when a value in the search form changes. This event is an additional event that allows the underlying GUI to capture changes in the search form. Passing arguments must include the field identifier and the new value.

onDataFetch: triggered when UI component 112 initiates a data fetch from the data source. Passing arguments must include the search tuple, the amount of data fetched, and the fetch direction.

onDataMoveUp: triggered when data is moved up.

onDataMoveDown: triggered when data is moved down.

onColumnClick: triggered when the user clicks on a column in the negative or positive table. The passing argument includes a data tuple included within the clicked row.

onReturnToZero: triggered when the user chooses to activate the return to offset 0 control.

onError: triggered when there is error displayed on the UI component 112. The passing arguments include the error definition.

onWarning: triggered when there is a warning displayed on the UI component 112. The passing arguments include a warning definition.

In one embodiment, UI component 112 includes structure that specifies the ruler, positive table and negative table, where the structure is supported by the data source of the UI component 112. The data source must have the capability of ordering and re-ordering data according to a user's request and performing searches on the ordered data and re-ordered data.

In one embodiment, the data source takes into account the specific ordering of data tuples as requested by a user and indicated on the header, and performs a search to find data tuples that are closest to the value(s) in the search form in the ruler. The closest data tuples found by the data source provide a starting point from which the negative and positive tables are populated. The negative table includes data tuples that are negative compared to the value(s) in the search form, based on the comparison relation 108. The positive table includes data tuples that match the value(s) in the search form and further includes other data tuples that are positive compared to the value(s) in the search form, based on the comparison relation 108. In one embodiment, the negative and positive tables are populated from the ruler outwards, based on the specific ordering of the data tuples specified by the search form in the ruler.

Details of the functionality of components of system 100 are described below relative to the discussion of FIG. 2 and FIGS. 3A-3B.

DEFINITION OF DATA SOURCE

In this section, relational algebra is used to provide a description of the data source that provides the set of data tuples 110. A set of domains D is defined as a basis for the data source: $D=\{D1, \ldots, Dn\}$, where $n \geq 1$. The data source DS is described as a number of n-tuples (i.e., data tuples) whose elements are members of the set of domains D:

$$DS=\{(d1, \ldots, dn):d1 \in D1, \ldots, dn \in Dn\}=D1 \times \ldots \times Dn$$

Every search is defined on a subset of the set of domains, as $S \subseteq D$, with the remainder defined as $S'=D-S \rightarrow D=S \cup S' \rightarrow |S|+|S'|=|D|$.

The data source DS is redefined as a Cartesian product of the subsets S and S':

$$DS=S \times S'=\{(s,s')\}$$

For further use, cardinalities are defined as $k=|S|, l=|S'|$

Two random elements x and y are defined as:

$$x=((x1, \ldots, xk),(x1', \ldots, xl')), y=((y1, \ldots, yk),(y1', \ldots, yk'))$$

The random elements x and y are related by comparison relation 108 as:

$$x<y \Leftrightarrow (x1<y1) \vee (x1=y1 \wedge x2<y2) \vee \ldots \vee (x1=y1 \wedge x2=y2 \wedge \ldots \wedge xk<yk) \text{ and}$$

$$x \geq y \Leftrightarrow (x1 \geq y1) \vee (x1=y1 \wedge x2 \geq y2) \vee \ldots \vee (x1=y1 \wedge x2=y2 \wedge \ldots \wedge xk \geq yk)$$

The data source must be ordered by the comparison relation 108 as:

$$DS=\{\ldots, e_i, e_{i+1}, \ldots : e_i \leq e_{i+i}\} \text{ for all members of the data source.}$$

The search tuple 106 provided by the user is denoted as $s=(s1, s2, \ldots, sk)$. The search tuple s fits in the ordered data source in a particular place:

$$\{\ldots, e_{-3}, e_{-2}, e_{-1}, s, e_1, e_2, e_3, \ldots : \ldots \leq e_{-3} \leq e_{-2} \leq e_{-1} < s \leq e_1 \leq e_2 \leq e_3 \leq \ldots\}$$

The ordered data source specified above can be obtained by multiple SQL queries, or with a single, more complex SQL query.

In one embodiment, the data source is implemented to receive only (1) the search tuple, even if $S=\{\phi\}$, (2) the number of rows the data source must deliver in the negative table, and (3) the number of rows the data source must deliver in the positive table. Alternatively, the data source receives the search tuple and one number that indicates both the number of rows in the negative table and the number of rows in the positive table.

In one embodiment, the data source implementation is constrained by a requirement to support partial matching of string fields. That is, a string value in a data tuple in the set of data tuples 110 that begins with a sequence of characters that exactly matches the corresponding string value in the search tuple 106, then the string values are partially matched and the data source implementation considers the string values to be equal when using the comparison relation 108. For example, with partial matching supported, "Da" in the search tuple 106 and "Dalibor" in a data tuple, the data source implementation evaluates "Da"="Dalibor" as true.

In the special case in which $S=\{\phi\}$ it means that the search is not used and is not defined. The data source is $DS=\{s, e_1, e_2, \ldots\}, s=( )$, which indicates that all members of the data source are positive in comparison to the search tuple, which is the 0-tuple in this special case.

Process for Managing a Set of Data Tuples

Figure 2:
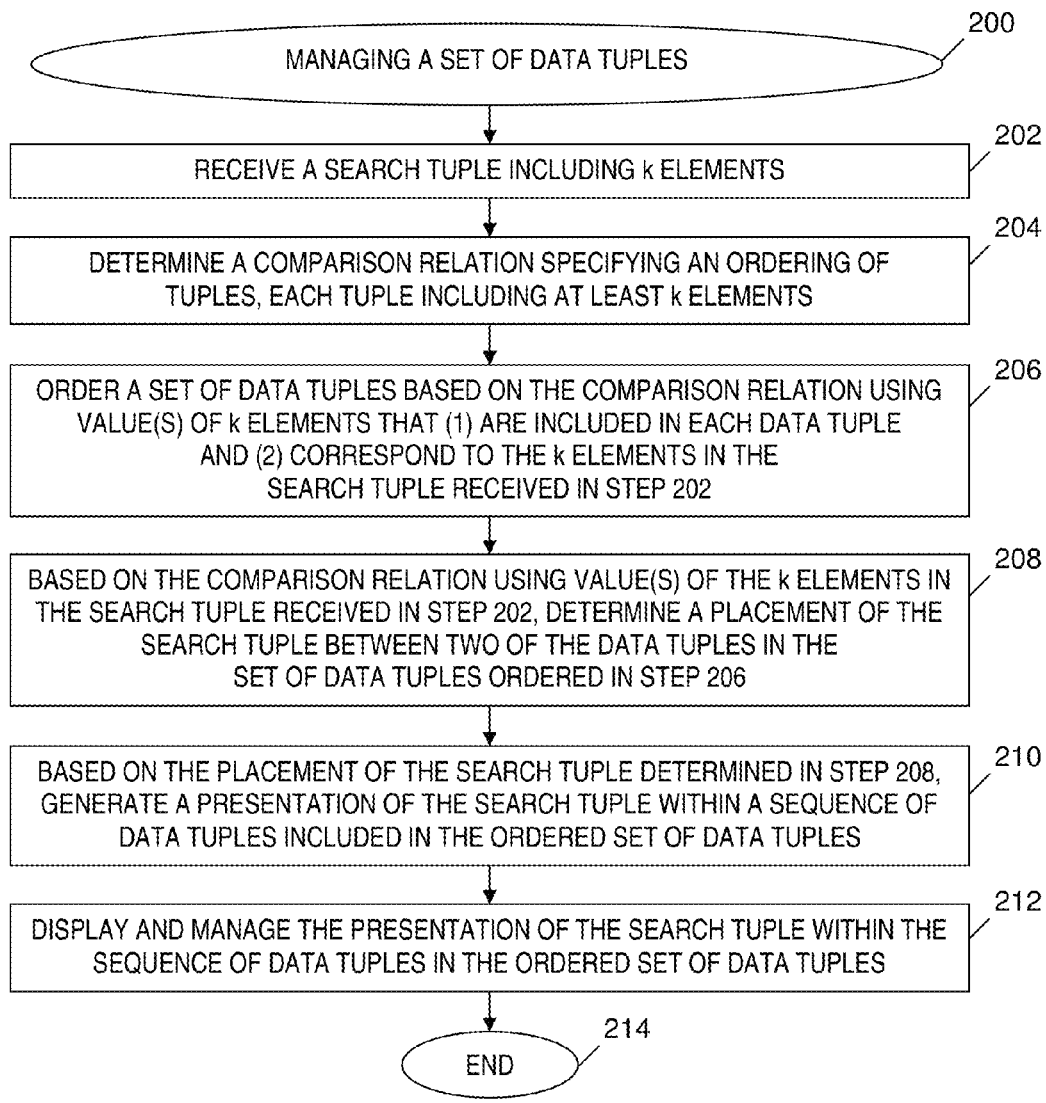
FIG. 2 is a flowchart of a process of managing a set of data tuples in the system of FIG. 1, in accordance with embodiments of the present invention.

FIG. 2 is a flowchart of a process of managing a set of data tuples in the system of FIG. 1, in accordance with embodiments of the present invention. The process of FIG. 2 starts at step 200. Prior to step 202, computer system 102 (see FIG. 1) may display data tuples included in the set of data tuples 110 (see FIG. 1), where the displayed data tuples are in an order dependent on the implementation of the underlying data source, and are not yet ordered according to a search tuple. In step 202, tuple management engine 104 (see FIG. 1) receives a search tuple 106 (see FIG. 1) that includes k elements, where k is an integer and k≥1.

In step 204, tuple management engine 104 (see FIG. 1) determines comparison relation 108 (see FIG. 1), which specifies an ordering of the set of data tuples 110 (see FIG. 1). Each data tuple in the set of data tuples 110 (see FIG. 1) includes k elements that correspond to the k elements included in search tuple 106 (see FIG. 1). Each data tuple in the set of data tuples 110 (see FIG. 1) may include more than k elements.

In step 206, tuple management engine 104 (see FIG. 1) orders the complete set of data tuples 110 (see FIG. 1) (i.e., the full data store) by using the comparison relation 108 (see FIG. 1) determined in step 204. The ordering of the set of data tuples 110 (see FIG. 1) in step 206 includes comparing the value(s) of the k elements in the search tuple 106 (see FIG. 1) received in step 202 to value(s) of the corresponding k elements included in each data tuple in the set of data tuples 110 (see FIG. 1). Hereinafter, in the discussion of FIG. 2, the result of ordering the set of data tuples 110 (see FIG. 1) in step 206 is referred to as "the ordered set of data tuples." Since step 206 orders an entire data set based on a search tuple, the ordering is different from filtering based on search conditions.

Ordering of data in a data source may depend on the implementation of the data source and the developer. A data store (e.g., database) may order "Jo"<"John" but a developer of a data source may decide to change the ordering so that "Jo"="John" to obtain a more native result for the user.

In step 208, based on the comparison relation 108 (see FIG. 1) determined in step 204 and using the value(s) of the k elements in the search tuple 106 (see FIG. 1) received in step 202, tuple management engine 104 (see FIG. 1) determines a placement of the search tuple 106 (see FIG. 1) between two consecutive data tuples in the ordered set of data tuples, so that the search tuple 106 (see FIG. 1) is ordered among the ordered set of data tuples in accordance with the comparison relation 108 (see FIG. 1).

In step 210, based on the placement of the search tuple 106 (see FIG. 1) determined in step 208, tuple management engine 104 (see FIG. 1) generates UI component 112 (see FIG. 1) that includes a presentation of the search tuple 106 (see FIG. 1) within a sequence of data tuples, where the sequence of data tuples is included in the ordered set of data tuples. The aforementioned sequence of data tuples includes at least the two consecutive data tuples between which is the placement determined in step 208.

In one embodiment, the UI component 112 (see FIG. 1) includes a ruler table that includes entry fields that receive value(s) in search tuple 106 (see FIG. 1). The ruler table may include a row of field names corresponding to the entry fields.

In step 212, tuple management engine 104 (see FIG. 1), another component of computer system 102 (see FIG. 1) or another computer system displays and manages the UI component 112 (see FIG. 1) that includes the presentation of the search tuple 106 (see FIG. 1) included within the sequence of data tuples included in the ordered set of data tuples.

Following step 212, the process of FIG. 2 ends at step 214.

Figure 3A:
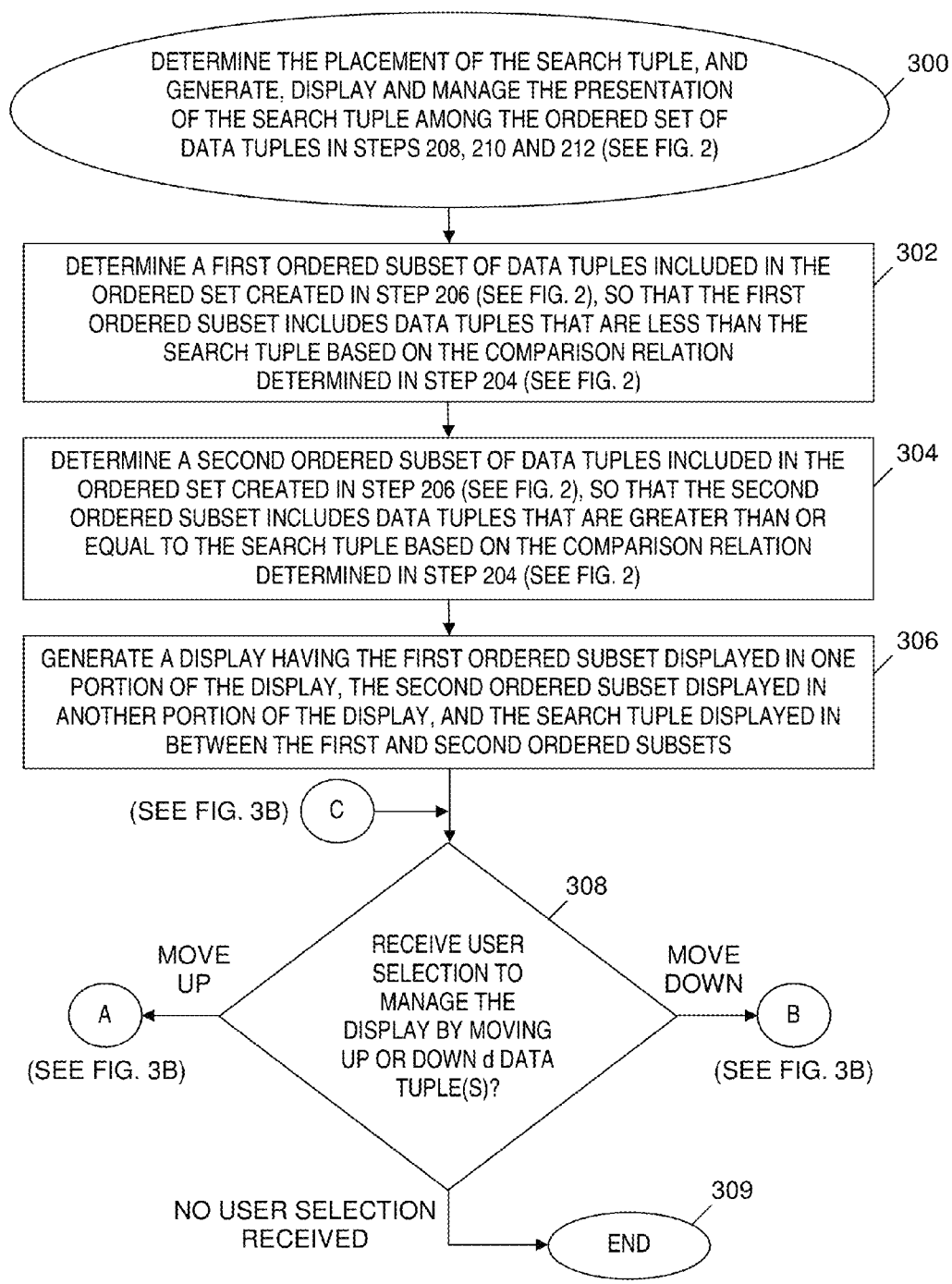
FIGS. 3A-3B depict a flowchart of a process of determining a placement of a search tuple and generating, displaying and managing a presentation of a search tuple within a sequence of data tuples included in an ordered set of data tuples in the process of FIG. 2, in accordance with embodiments of the present invention.
Figure 3B:
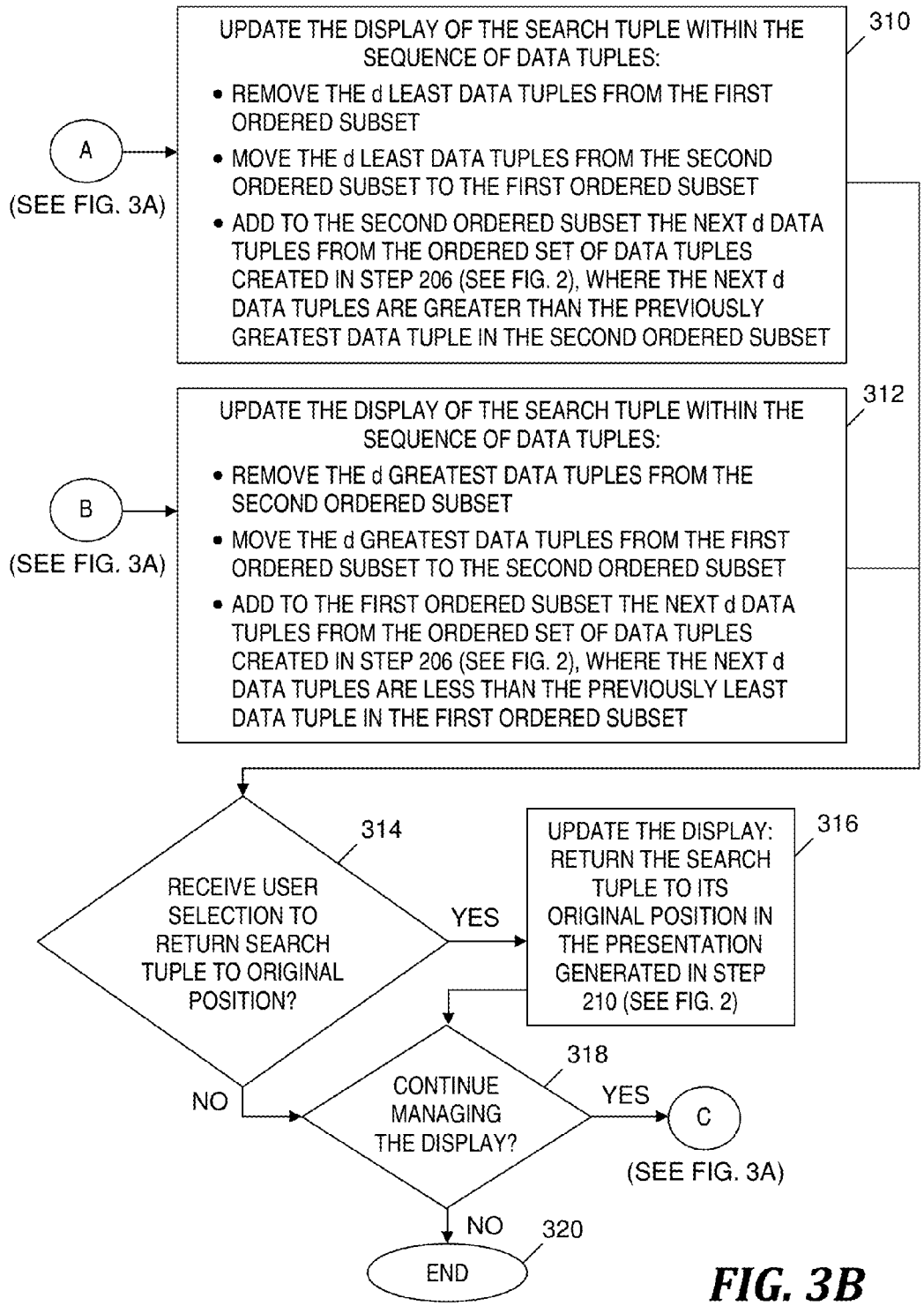

FIGS. 3A-3B depict a flowchart of a process of determining a placement of a search tuple and generating, displaying and managing a presentation of a search tuple within a sequence of data tuples included in an ordered set of data tuples in the process of FIG. 2, in accordance with embodiments of the present invention. The process of FIGS. 3A-3B starts at step 300 in FIG. 3A. In step 302, tuple management engine 104 (see FIG. 1) determines a first ordered subset of data tuples included in the ordered set of data tuples created in step 206 (see FIG. 2), so that the first ordered subset includes data tuples that are less than the search tuple 106 (see FIG. 1). The data tuples in the first ordered subset are less than the search tuple 106 (see FIG. 1) based on the comparison relation 108 (see FIG. 1) determined in step 204 (see FIG. 2) determining a value of an element in each of the data tuples in the first ordered subset is less than a value of a corresponding element in the search tuple 106 (see FIG. 1).

In step 304, tuple management engine 104 (see FIG. 1) determines a second ordered subset of data tuples included in the ordered set of data tuples created in step 206 (see FIG. 2), so that the second ordered subset includes data tuples that are greater than or equal to the search tuple 106 (see FIG. 1). The data tuples in the second ordered subset are greater than or equal to the search tuple 106 (see FIG. 1) based on the comparison relation 108 (see FIG. 1) determined in step 204 (see FIG. 2), which is used by tuple management engine 104 (see FIG. 1) to determine a value of an element in each of the data tuples in the second ordered subset is greater than or equal to a value of a corresponding element in the search tuple 106 (see FIG. 1). The aforementioned element in each data tuple in the second ordered subset is the corresponding element of the element in each data tuple in the first ordered subset, which is discussed above relative to step 302.

In an alternate embodiment, in step 304, based on the comparison relation 108 (see FIG. 1), tuple management engine 104 (see FIG. 1) determines a second ordered subset of data tuples included in the ordered set of data tuples created in step 206 (see FIG. 2), so that the second ordered subset includes data tuples that are greater than (but not equal to) the search tuple 106 (see FIG. 1). In this alternate embodiment, in step 302, based on the comparison relation 108 (see FIG. 1), tuple management engine 104 (see FIG. 1) determines a first ordered subset of data tuples included in the ordered set of data tuples created in step 206 (see FIG. 2), so that the first ordered subset includes data tuples that are less than or equal to the search tuple 106 (see FIG. 1).

In step 306, tuple management engine 104 (see FIG. 1) generates a display having the first ordered subset displayed in one portion of the display, the second ordered subset displayed in another portion of the display, and the search tuple displayed in between the first and second ordered subsets. In one embodiment, step 306 includes generating a display that includes the first ordered subset in an upper portion of the display, the second ordered subset in a lower portion of the display, and the search tuple in between the upper and lower portions of the display.

In an alternate embodiment, step 306 includes generating a display that includes the first ordered subset in a first portion of the display, the second ordered subset in a second portion of the display, and the search tuple in a third portion of the display. The first and second portions are distinguished from each other by a graphical element and/or a graphical attribute.

In step 308, tuple management engine 104 (see FIG. 1) determines whether a user selection is received, where the selection is an instruction to manage the display by moving the display up by d data tuples (i.e., move up) or moving the display down by d data tuples (i.e., move down). If the user selection is received in step 308 and the selection is to move up, then the process of FIGS. 3A-3B continues with step 310 in FIG. 3B. If the user selection is received in step 308 and the selection is to move down, then the process of FIGS. 3A-3B continues with step 312 in FIG. 3B. If no user selection is received in step 308, then the process of FIGS. 3A-3B ends at step 309.

In step 310 in FIG. 3B, which follows the determination in step 308 (see FIG. 3A) that a user selection to move up d data tuples is received, tuple management engine 104 (see FIG. 1) updates the display of the search tuple 106 (see FIG. 1) within a sequence of data tuples included in the set of data tuples 110 (see FIG. 1) ordered in step 206 (see FIG. 2) by:

Removing the d least data tuples from the first ordered subset

Moving the d least data tuples from the second ordered subset to the first ordered subset; and Adding to the second ordered subset the next d data tuples from the set of data tuples 110 (see FIG. 1) ordered in step 206 (see FIG. 2), where the next d data tuples are greater than the previously greatest data tuple in the second ordered subset In step 312, which follows the determination in step 308 (see FIG. 3A) that a user selection to move down d data tuples is received, tuple management engine 104 (see FIG. 1) updates the display of the search tuple 106 (see FIG. 1) within a sequence of data tuples included in the set of data tuples 110 (see FIG. 1) ordered in step 206 (see FIG. 2) by:

Removing the d greatest data tuples from the second ordered subset

Moving the d greatest data tuples from the first ordered subset to the second ordered subset; and Adding to the first ordered subset the next d data tuples from the set of data tuples 110 (see FIG. 1) ordered in step 206 (see FIG. 2), where the next d data tuples are less than the previously least data tuple in the first ordered subset Step 314 follows step 310 and step 312. In step 314, tuple management engine 104 (see FIG. 1) determines whether a user selection is received to return the search tuple 106 (see FIG. 1) to its original position in the presentation generated in step 210 (see FIG. 2). If tuple management engine 104 (see FIG. 1) determines in step 314 that the aforementioned user selection is received, then the Yes branch of step 314 is followed and step 316 is performed.

In step 316, tuple management engine 104 (see FIG. 1) updates the display by returning the search tuple to its original position in the presentation generated in step 210 (see FIG. 2). Step 318 follows step 316.

Returning to step 314, if tuple management engine 104 (see FIG. 1) determines that the user selection to return the search tuple to its original position is not received, then the No branch of step 314 is followed and step 318 is performed.

In step 318, which follows step 316 and the No branch of step 314, tuple management engine 104 (see FIG. 1) determines whether management of the display of the search tuple 106 (see FIG. 1) within the sequence of data tuples is continuing. If step 318 determines that the management of the display is continuing, then the Yes branch of step 318 is followed, and the process of FIGS. 3A-3B loops back to step 308 (see FIG. 3A). If step 318 determines that the management of the display is not continuing, then the No branch of step 318 is followed and the process of FIGS. 3A-3B ends at step 320.

EXAMPLES

In the examples presented in this section, a ruler table is implemented as a Dojo widget, using a Representational State Transfer (REST) service call with a JAVASCRIPT® Object Notation (JSON) content type as an interface to a JAVA® data source implementation. The data source implementation was made for a DB2® database. A Dojo widget is included in a Dojo Toolkit, which is an open source modular JAVASCRIPT® Toolkit offered by The Dojo Foundation located in Mountain View, Calif. The examples in this section use depth=8 and structure=[{field: "id", name:"ID"}, {field: "name", name: "Name"}, {field: "surname", name: "Surname"}, {field: "birthdate", name: "Birth date", type: "date", dateFormat: "dd.MM.yyyy"}, {field: "height", name: "Height", type: "integer"}, {field: "weight", name: "Weight", type: "decimal"}].

The set of domains for the data source in the examples in this section is:

D={id, name, surname, birthdate, height, weight}

FIG. 4A is an exemplary presentation of a UI component that includes data tuples prior to the presentation of data tuples generated, displayed and managed in the process of FIG. 2, in accordance with embodiments of the present invention. A UI component 400 includes a ruler table 401, which includes a search form 402 (i.e., a row of entry fields that may receive value(s) included in search tuple 106 (see FIG. 1)) and header cells 404 that include field names corresponding to the entry fields of the search form 402.

Ruler table 401 does not yet include values for a search and therefore does not yet order the set of data tuples 110 (see FIG. 1) based on search tuple 106 (see FIG. 1). Instead, a positive portion 406 of UI component 400 includes data tuples included in the set of data tuples 110 (see FIG. 1) and a negative portion 408 of UI component 400 includes no data tuples. The data tuples are ordered in portion 406 depending on the implementation of the underlying data source. In this example, the data source implementation uses a DB2® database; therefore, the data tuples are initially ordered in portion 406 according to the defined primary key, which is the id field.

UI component 400 provides options that can be selected by a user, including a return to offset 0 button 410, a clear search form button 412, a move data tuples down button 414, and a move data tuples up button 416. Activating return to offset 0 button 410 returns the search tuple in search form 402 to its original position after the user has activated the move data tuples down button 414 and/or the move data tuples up button 416. Activating the clear search form button 412 clears search form 402 so that all the entry fields in search form 402 are empty. Activating the move data tuples down button 414 pushes the ruler table 401 in a negative direction (i.e., towards data tuples that are less than the search tuple), so that data tuples in negative portion 408 move from the table in negative portion 408 to the table in positive portion 406. Activating the move data tuples up button 416 pushes the ruler table 401 in a positive direction (i.e., towards data tuples that are greater than the search tuple), so that data tuples in positive portion 406 moves from the table in positive portion 406 to the table in negative portion 408.

FIG. 4B is an exemplary presentation of the UI component of FIG. 4A, where the data tuples in FIG. 4A are re-ordered based on a user selection of a header cell, in accordance with embodiments of the present invention. UI component 400 in FIG. 4B includes a portion 420, which includes data tuples from the set of data tuples 110 (see FIG. 1) that are re-ordered according to values in the Name field. The re-ordering is a result of a user selection of the Name field in header cells 404 to manually sort the set of data tuples 110 (see FIG. 1). The user selects the Name field by clicking (or otherwise activating) the header cell labeled "Name" in ruler table 401, and the user selection is indicated by an indicator 422 (e.g., a green arrow). Similar to FIG. 4A, portion 408 and search form 402 remain empty, and buttons 410, 412, 414 and 416 have the functionality described above relative to FIG. 4A.

FIG. 4C is an exemplary presentation of a search tuple within a sequence of data tuples included in an ordered set of data tuples, where the presentation is generated, displayed and managed in the process of FIG. 2, and where the placement of the search tuple is based on a value in the search tuple, in accordance with embodiments of the present invention. UI component 400 in FIG. 4C includes ruler table 401, which includes search form 402 and header cells 404. A user enters "Da" in an entry field 430 in search form 402. That is, search tuple 106 (see FIG. 1) that has "Da" as the value of the Name field is included in search form 402, and is received in step 202 (see FIG. 2). In this case, S={name}, S'={id, surname, birthdate, height, weight}, and the search tuple is s=("Da").

In response to the user entry of "Da", tuple management engine 104 (see FIG. 1) calls the data source to fetch data tuples from the set of data tuples 110 (see FIG. 1), and automatically orders the fetched data tuples according to the comparison relation 108 (see FIG. 1) determined in step 204 (see FIG. 2), using the value "Da" in the search tuple. The automatic ordering is denoted by a different indicator 436 (e.g., a red arrow), to distinguish the ordering from the manual ordering indicated by indicator 422 in FIG. 4B.

Tuple management engine 104 (see FIG. 1) determines in step 208 (see FIG. 2) a placement of the search tuple 106 (see FIG. 1) between the data tuple that has "Crnko" in the Name field and the data tuple that has "Damir" in the Name field, because "Da" is ordered between "Crnko" and "Damir" according to the comparison relation 108 (see FIG. 1).

Tuple management engine 104 (see FIG. 1) generates the presentation in step 210 (see FIG. 2) included in UI component 400, so that the search tuple 106 (see FIG. 1) having "Da" in the Name field is within the sequence of data tuples beginning with the data tuple having "Adalbert" in the Name field and ending with the data tuple having "Ivan" in the Name field, and in particular, is positioned in the placement determined in step 208 (see FIG. 2) (i.e., between the data tuple having "Crnko" in the name field and the data tuple having "Damir" in the Name field).

More particularly, the presentation resulting from step 210 (see FIG. 2) includes the search tuple 106 (see FIG. 1) between one sub-sequence of data tuples in a positive portion 432 of UI component 400 and another sub-sequence of data tuples in a negative portion 434 of UI component 400.

Buttons 410, 412, 414 and 416 in FIG. 4C have the functionality described above relative to FIG. 4A.

Tuple management engine 104 (see FIG. 1) displays and manages UI component 400 in FIG. 4C, by performing step 212 (see FIG. 2).

Figure 4D:
FIG. 4D is an exemplary presentation of a search tuple within a sequence of data tuples included in an ordered set of data tuples, where the presentation is generated, displayed and managed in the process of FIG. 2, and where the data tuples in FIG. 4C are re-ordered based on an entry of a second value in the search tuple, in accordance with embodiments of the present invention.

FIG. 4D is an exemplary presentation of a search tuple within a sequence of data tuples included in an ordered set of data tuples, where the presentation is generated, displayed and managed in the process of FIG. 2, and where the data tuples in FIG. 4C are re-ordered based on an entry of a second value in the search tuple, in accordance with embodiments of the present invention. UI component 400 in FIG. 4D includes ruler table 401, which includes search form 402 and header cells 404. A user makes a second entry in search form 402 by entering "197" in an entry field 440, where "Da" was previously entered in entry field 430 in search form 402. That is, search tuple 106 (see FIG. 1) that has "Da" as the value of the Name field and 197 as the value of the Height field is included in search form 402, and is received in step 202 (see FIG. 2). In this case, S={name, height}, S'={id, surname, birthdate, weight}, and the search tuple is s=("Da", 197).

In response to the user entry of 197 in entry field 440, tuple management engine 104 (see FIG. 1) calls the data source to fetch data tuples from the set of data tuples 110 (see FIG. 1), and automatically orders the fetched data tuples according to the comparison relation 108 (see FIG. 1) determined in step 204 (see FIG. 2), using the values "Da" and 197 in the search tuple. The automatic ordering is denoted by indicators 436 and 446 (e.g., red arrows), which distinguish the type of ordering from the manual ordering indicated by indicator 422 in FIG. 4B.

Tuple management engine 104 (see FIG. 1) determines in step 208 (see FIG. 2) a placement of the search tuple 106 (see FIG. 1) between the data tuple that has "Daniel" in the Name field and the data tuple that has "Darije" in the Name field, based on the comparison relation 108 (see FIG. 1). Because in this example, the comparison relation 108 (see FIG. 1) considers "Da" in the Name field to be equal to the Name field values in the data tuples having "Damir", "Daniel" and "Darije", the comparison relation next orders the data tuples having equal Name field values based on the values in the Height field. Since the height of 195 in the data tuple having "Damir" in the Name field and the height of 185 in the data tuple having "Daniel" in the Name field are less than the height of 197 in the search tuple, the data tuples having "Damir" and "Daniel" in the Name field are placed in the negative portion 444 along with the data tuples that had been in portion 434 in FIG. 4C. Furthermore, because the height of 201 in the data tuple having "Darije" in the Name field is greater than the height of 197 in the search tuple, the data tuple having "Darije" in the Name field is placed in the positive portion 442 along with the data tuples that had been greater than the data tuple having "Darije" in portion 432 in FIG. 4C, along with two additional data tuples (i.e., the data tuples having "Ivana" in the Name field) fetched from the ordered set of data tuples 110 (see FIG. 1) to fill up the rows in the table in portion 442.

Tuple management engine 104 (see FIG. 1) generates the presentation in step 210 (see FIG. 2) included in UI component 400, so that the search tuple 106 (see FIG. 1) having "Da" in the Name field and 197 in the Height field is within the sequence of data tuples beginning with the data tuple having "Adalbert" in the Name field and ending with the data tuple having "Ivana" in the Name field and 16 in the id field, and in particular, is positioned in the placement determined in step 208 (see FIG. 2) (i.e., between the data tuple having "Daniel" in the Name field and the data tuple having "Darije" in the Name field).

More particularly, the presentation resulting from step 210 (see FIG. 2) includes the search tuple 106 (see FIG. 1) between one sub-sequence of data tuples in positive portion 442 of UI component 400 and another sub-sequence of data tuples in negative portion 444 of UI component 400.

Buttons 410, 412, 414 and 416 in FIG. 4D have the functionality described above relative to FIG. 4A.

Tuple management engine 104 (see FIG. 1) displays and manages UI component 400 in FIG. 4D, by performing step 212 (see FIG. 2).

Figure 4E:
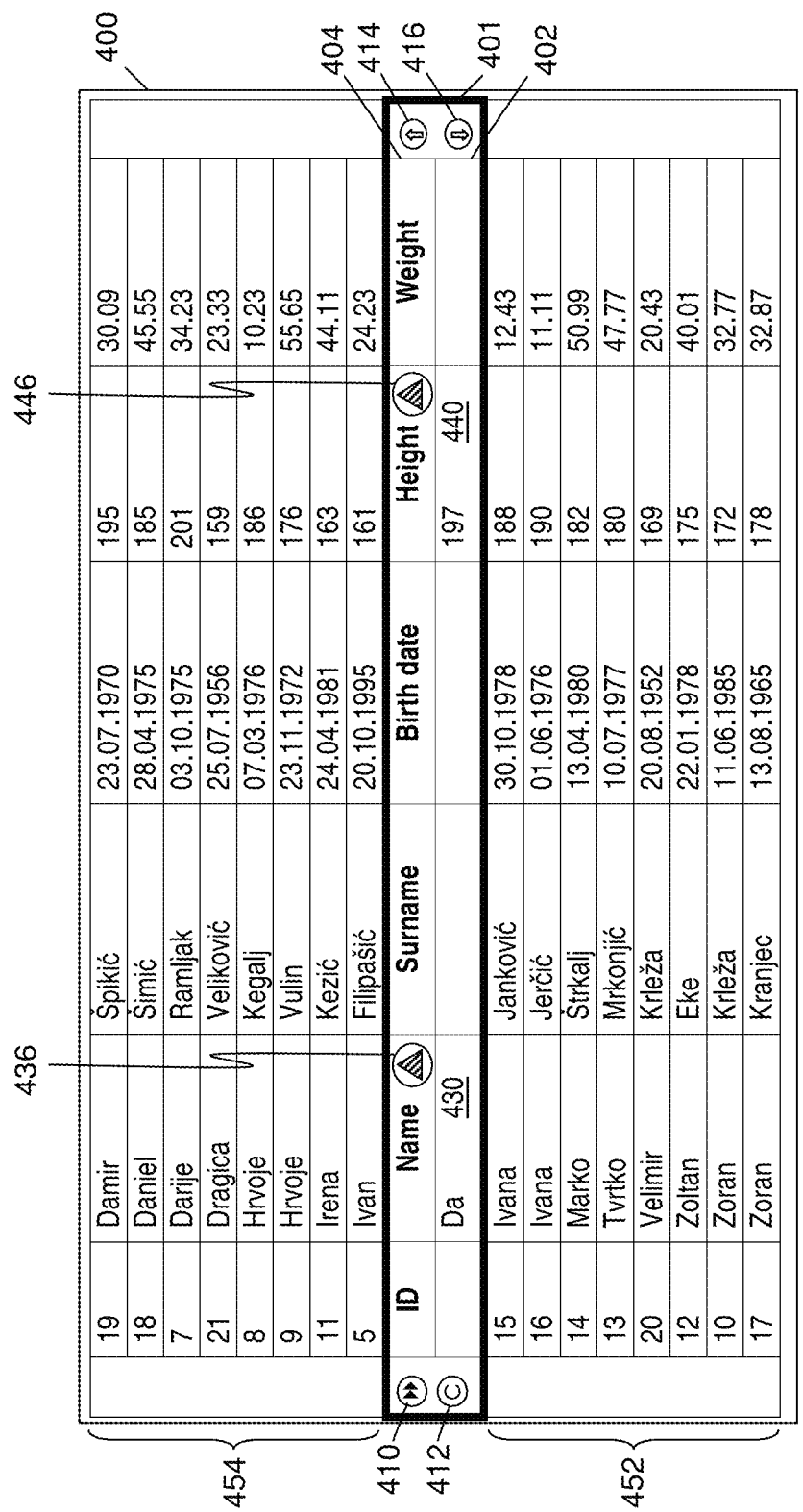
FIG. 4E is an exemplary display of a search tuple within a sequence of data tuples included in an ordered set of data tuples, where the display results from managing the presentation in FIG. 4D in the process of FIGS. 3A-3B, in accordance with embodiments of the present invention.

FIG. 4E is an exemplary display of a search tuple within a sequence of data tuples included in an ordered set of data tuples, where the display results from managing the presentation in FIG. 4D in the process of FIGS. 3A-3B, in accordance with embodiments of the present invention. UI component 400 in FIG. 4E includes ruler table 401, which includes search form 402 and header cells 404. As previously shown in FIG. 4C and FIG. 4D, the user has made entries in search form 402 to include "Da" in entry field 430 and 197 in entry field 440. That is, search tuple 106 (see FIG. 1) that has "Da" as the value of the Name field and 197 as the value of the Height field is included in search form 402, and is received in step 202 (see FIG. 2). The automatic ordering of the set of data tuples 110 (see FIG. 1) is based on the "Da" value in the Name field and the 197 value in the Height field, which are denoted by indicators 436 and 446 (e.g., red arrows), respectively. Indicators 436 and 446 distinguish the automatic ordering from the manual ordering indicated by indicator 422 in FIG. 4B. In this case, S={name, height}, S'={id, surname, birthdate, weight}, and the search tuple is s=("Da", 197).

To change UI component 400 from the display in FIG. 4D to the display in FIG. 4E, the user activates the move data tuples up button 416 to change the offset from 0 to 6 in step 308 (see FIG. 3A). The value of d in step 308 is 6 because the offset changes by 6 (i.e., 6−0=6). In response to the user activating the move data tuples up button 416 with d=6, tuple management engine 104 (see FIG. 1) updates the display of the search tuple within the sequence of data tuples previously shown in FIG. 4D by:

(1) removing any data tuples in the 6 uppermost rows of the table in negative portion 444 (see FIG. 4D) (i.e., removing the uppermost null data tuple and the five data tuples with the following values in the Name field: "Adalbert", "Albert", "Alberto", "Bero" and "Crnko");

(2) moving the six least data tuples from the positive portion 442 (see FIG. 4D) to the negative portion 454 (i.e., moving to negative portion 454 the data tuples that have the following values in the Name field: "Darije", "Dragica", "Hrvoje", Hrvoje", "Irena" and "Ivan"); and (3) adding to the positive portion 452 the next six data tuples from the set of data tuples 110 (see FIG. 1) that had been ordered in step 206 (see FIG. 2). The next six data tuples are greater than the previously greatest data tuple in the positive portion 442 (see FIG. 4D). That is, the next six data tuples have the following values in the Name field: "Marko", "Tvrtko", "Velimir", "Zoltan", "Zoran" and "Zoran", which are greater than the data tuple that has 16 in the id field and "Ivana" in the Name field, which had been the greatest data tuple in the previous positive portion 442 (see FIG. 4D).

If the user activates the return to offset 0 button 410 in step 314 (see FIG. 3B), then the display in UI component 400 in FIG. 4E is updated in step 316 (see FIG. 3B) by changing back to the display in UI component 400 in FIG. 4D, where the offset=0.

Buttons 410, 412, 414 and 416 in FIG. 4D have the functionality described above relative to FIG. 4A.

Tuple management engine 104 (see FIG. 1) displays and manages UI component 400 in FIG. 4E, by performing step 212 (see FIG. 2).

Figure 5:
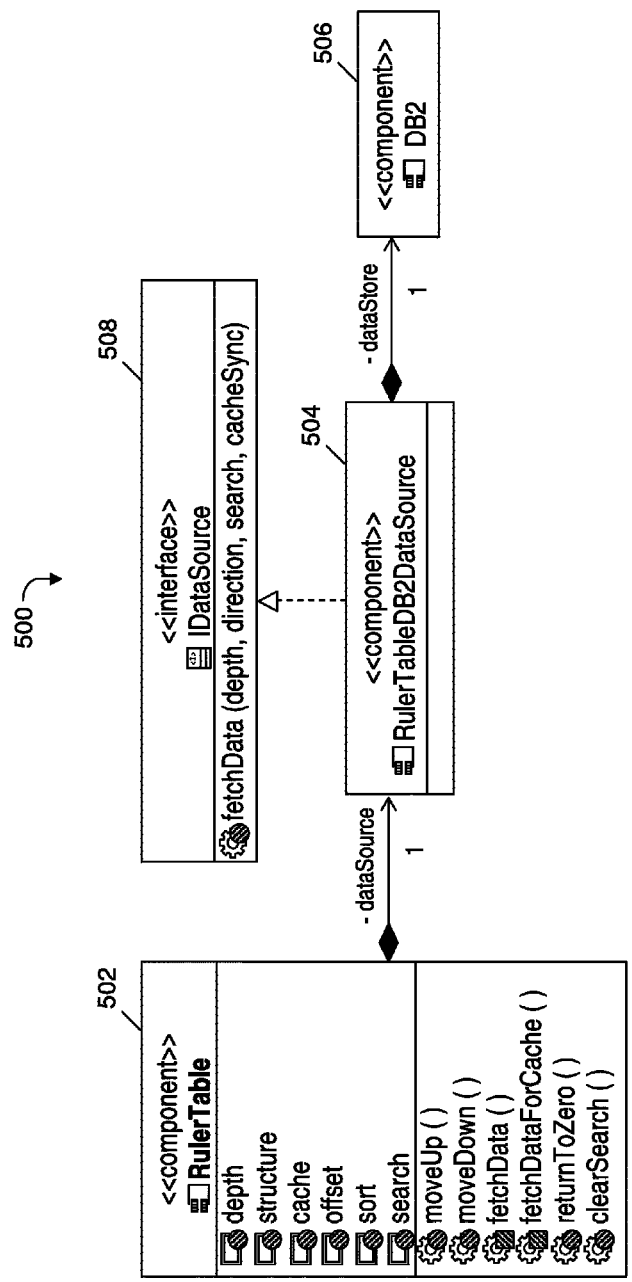
FIG. 5 is an exemplary diagram specifying a definition of an interface between a ruler table component and a data source, where the data source includes the set of data tuples managed in the process of FIG. 2, and where the ruler table component defines a search tuple whose placement is determined in the process of FIGS. 3A-3B, in accordance with embodiments of the present invention.

FIG. 5 is an exemplary diagram specifying a definition of an interface between a ruler table component and a data source, where the data source includes the set of data tuples managed in the process of FIG. 2, and where the ruler table component defines a search tuple whose placement is determined in the process of FIGS. 3A-3B, in accordance with embodiments of the present invention. Diagram 500 includes components 502, 504 and 506, and an interface 508. Interface 508 between component 502 specifying a ruler table and component 504 specifying an underlying data source is strictly defined as a call with a fixed number of parameters. The UI component that may include the presentation displayed in step 212 (see FIG. 2) depends on the interface and behavior of the data source. The implementation of the data source may be a realization of an interface for a particular data store (i.e., component 506). The data store being used for the data source implementation needs the ability to support the needed data source behavior. Databases can generally support such data source behavior, and a data source can be successfully implemented with a manageable amount of effort. The present invention is not limited to the data store being a database; other types of data stores are contemplated by the present invention, such as a data store containing a probe data stream. Greater effort is required to support a cache for the ruler table and data source synchronization. The underlying data store can support the ruler table cache and data source synchronization, or such support can be an additional task for implementing in the data source.

Computer System

Figure 6:
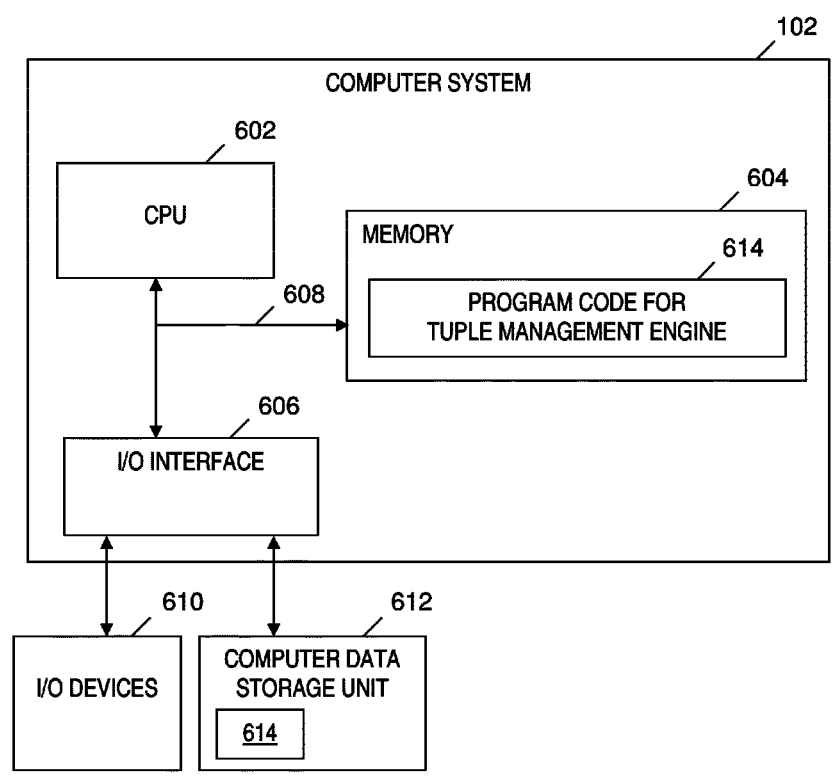
FIG. 6 is a block diagram of a computer system that is included in the system of FIG. 1 and that implements the processes of FIG. 2 and FIGS. 3A-3B, in accordance with embodiments of the present invention.

FIG. 6 is a block diagram of a computer system that is included in the system of FIG. 1 and that implements the processes of FIG. 2 and FIGS. 3A-3B, in accordance with embodiments of the present invention. The computer system depicted in FIG. 6 includes a computer system 102, which generally comprises a central processing unit (CPU) 602, a memory 604, an input/output (I/O) interface 606, and a bus 608. Further, computer system 102 is coupled to I/O devices 610 and a computer data storage unit 612.

CPU 602 performs computation and control functions of computer system 102, including carrying out instructions included in program code for tuple management engine 614 (hereinafter referred to as program code 614). The instructions included in program code 614 are carried out by CPU 602 via memory 604. CPU 602 may comprise a single processing unit, or be distributed across one or more processing units in one or more locations (e.g., on a client and server). In one embodiment, program code 614 includes program code in tuple management engine 104 (see FIG. 1).

Memory 604 may comprise any known computer-readable storage medium, which is described below. In one embodiment, cache memory elements of memory 604 provide temporary storage of at least some program code (e.g., program code 614) in order to reduce the number of times code must be retrieved from bulk storage while instructions of the program code are carried out. Moreover, memory 604 may reside at a respective single physical location, comprising one or more types of data storage, or be distributed across a plurality of physical systems in various forms. Further, memory 604 can include data distributed across, for example, a local area network (LAN) or a wide area network (WAN).

I/O interface 606 comprises any system for exchanging information to or from an external source. I/O devices 610 comprise any known type of external device, including a display device (e.g., monitor), keyboard, mouse, printer, speakers, handheld device, facsimile, etc. Bus 608 provides a communication link between each of the components in computer system 102, and may each comprise any type of transmission link, including electrical, optical, wireless, etc.

I/O interface 606 also allows computer system 102 to store information (e.g., data or program instructions such as program code 614) on and retrieve the information from computer data storage unit 612, or another computer data storage unit (not shown). Computer data storage unit 612 may comprise any known computer-readable storage medium, which is described below. For example, computer data storage unit 612 may be a non-volatile data storage device, such as a magnetic disk drive (i.e., hard disk drive) or an optical disc drive (e.g., a CD-ROM drive which receives a CD-ROM disk).

Memory 604 and/or storage unit 612 may store program code 614 that includes instructions that are carried out by CPU 602 via memory 604 to manage a set of data tuples. Although FIG. 6 depicts memory 604 as including program code 614, the present invention contemplates embodiments in which memory 604 does not include all of program code 614 simultaneously, but instead at one time includes only a portion of program code 614.

Further, memory 604 may include other systems not shown in FIG. 6, such as an operating system that runs on CPU 602 and provides control of various components within and/or connected to computer system 102.

Storage unit 612 and/or one or more other computer data storage units (not shown) that are coupled to computer system 102 may store search tuple 106 (see FIG. 1), comparison relation 108 (see FIG. 1), set of data tuples 110 (see FIG. 1), and/or UI component 112 (see FIG. 1).

As will be appreciated by one skilled in the art, the present invention may be embodied as a system, method or computer program product. Accordingly, an aspect of an embodiment of the present invention may take the form of an entirely hardware aspect, an entirely software aspect (including firmware, resident software, micro-code, etc.) or an aspect combining software and hardware aspects that may all generally be referred to herein as a "module". Furthermore, an embodiment of the present invention may take the form of a computer program product embodied in one or more computer-readable medium(s) (e.g., memory 604 and/or computer data storage unit 612) having computer-readable program code (e.g., program code 614) embodied or stored thereon.

Any combination of one or more computer-readable mediums (e.g., memory 604 and computer data storage unit 612) may be utilized. The computer readable medium may be (1) a computer-readable storage medium or (2) a computer-readable signal medium. As used herein, a computer-readable storage medium is not a computer-readable signal medium. In the context of this document, a computer-readable storage medium is a physical, tangible storage medium that can contain or store a program (e.g., program code 614) for use by or in connection with a system, apparatus, or device for carrying out instructions in the program, and which is not a signal per se and is not a transitory form of signal transmission.

In one embodiment, the computer-readable storage medium is a physical, tangible computer-readable storage device or physical, tangible computer-readable storage apparatus that is not a signal per se and is not a transitory form of signal transmission. A computer-readable storage medium may be, for example, an electronic, magnetic, optical, electromagnetic, or semiconductor system, apparatus, device or any suitable combination of the foregoing that is not a signal per se and is not a transitory form of signal transmission. A non-exhaustive list of more specific examples of the computer-readable storage medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing, where the aforementioned more specific examples do not include a signal per se or a transitory form of signal transmission.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, as described above, and that can communicate, propagate, or transport a program for use by or in connection with a system, apparatus, or device for carrying out instructions.

Program code (e.g., program code 614) embodied on a computer-readable medium may be transmitted using any appropriate medium, including but not limited to wireless, wireline, optical fiber cable, radio frequency (RF), etc., or any suitable combination of the foregoing.

Computer program code (e.g., program code 614) for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 102 or another computer system (not shown) having components analogous to the components of computer system 102. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2 and FIGS. 3A-3B) and/or block diagrams of methods, apparatus (systems) (e.g., FIG. 1 and FIG. 6), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 614). These computer program instructions may be provided to one or more hardware processors (e.g., CPU 602) of a general purpose computer, special purpose computer, or other programmable data processing apparatus to produce a machine, such that the instructions, which are carried out via the processor(s) of the computer or other programmable data processing apparatus, create means for implementing the functions/acts specified in the flowchart and/or block diagram block or blocks.

These computer program instructions may also be stored in a computer-readable medium (e.g., memory 604 or computer data storage unit 612) that can direct a computer (e.g., computer system 102), other programmable data processing apparatus, or other devices to function in a particular manner, such that the instructions (e.g., program code 614) stored in the computer-readable medium produce an article of manufacture including instructions which implement the function/act specified in the flowchart and/or block diagram block or blocks.

The computer program instructions may also be loaded onto a computer (e.g., computer system 102), other programmable data processing apparatus, or other devices to cause a series of operational steps to be performed on the computer, other programmable apparatus, or other devices to produce a computer implemented process such that the instructions (e.g., program code 614) which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to managing a set of data tuples. Thus, an embodiment of the present invention discloses a process for supporting computer infrastructure, wherein the process comprises a first computer system providing at least one support service for at least one of integrating, hosting, maintaining and deploying computer-readable code (e.g., program code 614) in a second computer system (e.g., computer system 102) comprising one or more processors (e.g., CPU 602), wherein the processor(s) carry out instructions contained in the code causing the second computer system to manage a set of data tuples.

In another embodiment, the invention provides a method that performs the process steps of the invention on a subscription, advertising and/or fee basis. That is, a service provider, such as a Solution Integrator, can offer to create, maintain, support, etc. a process of managing a set of data tuples. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2 and FIGS. 3A-3B and the block diagrams in FIG. 1 and FIG. 6 illustrate the architecture, functionality, and operation of possible implementations of systems, methods, and computer program products according to various embodiments of the present invention. In this regard, each block in the flowchart or block diagrams may represent a module, segment, or portion of code (e.g., program code 614), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of managing a set of data tuples, the method comprising the steps of:

a computer receiving a search tuple including k elements, k is an integer and k≥1;

the computer determining a comparison relation specifying an ordering of tuples, each tuple including k elements;

the computer ordering the set of data tuples by using the comparison relation and based on value(s) of k elements included in each data tuple and corresponding value(s) of the k elements included in the received search tuple;

based on the comparison relation, the computer determining a placement of the search tuple between two consecutive data tuples in the ordered set of data tuples, so that (1) one of the two consecutive data tuples is closest, based on the comparison relation, to the search tuple among data tuple(s) in the ordered set of data tuples whose k elements includes one element whose value is less than a value of a corresponding one of the k elements included in the search tuple and the other one of the two consecutive data tuples is closest, based on the comparison relation, to the search tuple among other data tuple(s) in the ordered set of data tuples whose k elements have value(s) that are greater than or equal to the value(s) of the k elements included in the search tuple, or (2) the one of the two consecutive data tuples is closest, based on the comparison relation, to the search tuple among data tuple(s) in the ordered set of data tuples whose k elements have value(s) that are less than or equal to the value(s) of the k elements included in the search tuple and the other one of the two consecutive data tuples is closest, based on the comparison relation, to the search tuple among other data tuple(s) in the ordered set of data tuples whose k elements includes one element whose value is greater than a value of a corresponding one of the k elements included in the search tuple; and based on the placement of the search tuple between the two consecutive data tuples, the computer generating a presentation of the search tuple and a sequence of data tuples included in the ordered set of data tuples so that the search tuple is displayed between first and second sub-sequences of the sequence of data tuples, the first sub-sequence including the one of the two consecutive data tuples, and the second sub-sequence including the other one of the two consecutive data tuples.

2. The method of claim 1, further comprising the steps of:

subsequent to the step of the computer generating the presentation, the computer receiving a selection to (1) move the presentation up through the ordered set of data tuples by d data tuples (move up by d data tuples) or (2) move the presentation down through the ordered set of data tuples by d data tuples (move down by d data tuples), d is an integer and d≥1;

in response to the step of receiving the selection, and if the received selection is to move up by d data tuples, the computer generating a modification of the presentation by:

removing a first d data tuples from the first sub-sequence;

moving a first d data tuples from the second sub-sequence to be a last d data tuples in the first sub-sequence;

fetching and adding to the second sub-sequence a next d data tuples in the set of ordered data tuples that are greater than a last data tuple in the second sub-sequence, so that the added next d data tuples are a new last d data tuples in the second sub-sequence; and subsequent to the steps of removing the first d data tuples from the first sub-sequence, moving the first d data tuples from the second sub-sequence, and fetching and adding to the second sub-sequence the next d data tuples, creating the modification of the presentation having one portion and another portion, so that the first sub-sequence is in the one portion of the presentation, the second sub-sequence is in the other portion of the presentation and the search tuple is between the one portion and the other portion; and in response to the step of receiving the selection, and if the received selection is to move down by d data tuples, the computer generating a modification of the presentation by:

removing a last d data tuples from the second sub-sequence;

moving a last d data tuples from the first sub-sequence to be a first d data tuples in the second sub-sequence;

fetching and adding to the first sub-sequence a next d data tuples in the set of ordered data tuples that are less than a first data tuple in the first sub-sequence, so that the added next d data tuples are a new first d data tuples in the first sub-sequence; and subsequent to the steps of removing the last d data tuples from the second sub-sequence, moving the last d data tuples from the first sub-sequence, and fetching and adding to the first sub-sequence the next d data tuples, creating the modification of the presentation having the one portion and the other portion, so that the first sub-sequence ordered set is in the one portion of the presentation, the second sub-sequence is in the other portion of the presentation and the search tuple is between the one portion and the other portion.

3. The method of claim 2, further comprising the steps of:

subsequent to the step of generating the modification of the presentation if the received selection is to move up by d data tuples or to move down by d data tuples, the computer receiving a second selection to return the presentation to an original presentation that resulted from the step of generating the presentation of the search tuple and the sequence of data tuples; and in response to the step of receiving the second selection, the computer re-generating the presentation of the search tuple and the sequence of data tuples.

4. The method of claim 1, wherein the step of generating the presentation of the search tuple and the sequence of data tuples the step of generating the presentation so that no value in the first sub-sequence and no value in the second sub-sequence is required to have a closeness to any value of the k elements of the search tuple that is within a threshold amount.

5. The method of claim 1, wherein the step of generating the presentation of the search tuple and the sequence of data tuples the step of the computer generating the presentation on a single page, regardless of how many data tuples in the set of data tuples match the search tuple.

6. The method of claim 1, further comprising the step of the computer providing a single user interface (UI) component that includes a search form having entry fields receiving the value(s) of the k elements included in the search tuple, wherein the step of generating the presentation includes the step of generating the presentation in the single UI component.

7. The method of claim 6, further comprising the steps of:

subsequent to the step of generating the presentation in the single UI component, the computer receiving in the search form included in the single UI component an update of a value of one of the k elements included in the search tuple;

based on the received update of the value and based on the comparison relation, the computer automatically updating the placement of the search tuple so that the search tuple is between two other consecutive data tuples in the ordered set of data tuples; and based on the received update of the value and based on the updated placement of the search tuple between the two other consecutive data tuples, the computer generating an updated presentation of the search tuple among another sequence of data tuples included in the ordered set of data tuples, the other sequence including at least the two other consecutive data tuples.

8. The method of claim 6, further comprising the steps of:

subsequent to the step of generating the presentation in the single UI component, the computer receiving in the search form included in the single UI component a value of another element included in the search tuple, the other element being other than one of the k elements included in the search tuple;

based on the received value of the other element in the search form, the computer re-ordering the set of data tuples by using the comparison relation;

the computer automatically updating the placement of the search tuple so that the search tuple is between two other consecutive data tuples included in the re-ordered set of data tuples; and based on the updated placement of the search tuple between the two other consecutive data tuples, the computer generating an updated presentation of the search tuple among another sequence of data tuples included in the ordered set of data tuples, the other sequence including at least the two other consecutive data tuples.

9. A computer system comprising:

a central processing unit (CPU);

a memory coupled to the CPU;

a computer-readable, tangible storage device coupled to the CPU, the storage device containing instructions that are carried out by the CPU via the memory to implement a method of managing a set of data tuples, the method comprising the steps of:

the computer system receiving a search tuple including k elements, k is an integer and k≥1;

the computer system determining a comparison relation specifying an ordering of tuples, each tuple including k elements;

the computer system ordering the set of data tuples by using the comparison relation and based on value(s) of k elements included in each data tuple and corresponding value(s) of the k elements included in the received search tuple;

based on the comparison relation, the computer system determining a placement of the search tuple between two consecutive data tuples in the ordered set of data tuples, so that (1) one of the two consecutive data tuples is closest, based on the comparison relation, to the search tuple among data tuple(s) in the ordered set of data tuples whose k elements includes one element whose value is less than a value of a corresponding one of the k elements included in the search tuple and the other one of the two consecutive data tuples is closest, based on the comparison relation, to the search tuple among other data tuple(s) in the ordered set of data tuples whose k elements have value(s) that are greater than or equal to the value(s) of the k elements included in the search tuple, or (2) the one of the two consecutive data tuples is closest, based on the comparison relation, to the search tuple among data tuple(s) in the ordered set of data tuples whose k elements have value(s) that are less than or equal to the value(s) of the k elements included in the search tuple and the other one of the two consecutive data tuples is closest, based on the comparison relation, to the search tuple among other data tuple(s) in the ordered set of data tuples whose k elements includes one element whose value is greater than a value of a corresponding one of the k elements included in the search tuple; and based on the placement of the search tuple between the two consecutive data tuples, the computer system generating a presentation of the search tuple and a sequence of data tuples included in the ordered set of data tuples so that the search tuple is displayed between first and second sub-sequences of the sequence of data tuples, the first sub-sequence including the one of the two consecutive data tuples, and the second sub-sequence including the other one of the two consecutive data tuples.

10. The computer system of claim 9, wherein the method further comprises the steps of:
subsequent to the step of the computer system generating the presentation, the computer system receiving a selection to (1) move the presentation up through the ordered set of data tuples by d data tuples (move up by d data tuples) or (2) move the presentation down through the ordered set of data tuples by d data tuples (move down by d data tuples), d is an integer and d≥1;
in response to the step of receiving the selection, and if the received selection is to move up by d data tuples, the computer system generating a modification of the presentation by:
removing a first d data tuples from the first sub-sequence;
moving a first d data tuples from the second sub-sequence to be a last d data tuples in the first sub-sequence;
fetching and adding to the second sub-sequence a next d data tuples in the set of ordered data tuples that are greater than a last data tuple in the second sub-sequence, so that the added next d data tuples are a new last d data tuples in the second sub-sequence; and
subsequent to the steps of removing the first d data tuples from the first sub-sequence, moving the first d data tuples from the second sub-sequence, and fetching and adding to the second sub-sequence the next d data tuples, creating the modification of the presentation having one portion and another portion, so that the first sub-sequence is in the one portion of the presentation, the second sub-sequence is in the other portion of the presentation and the search tuple is between the one portion and the other portion; and
in response to the step of receiving the selection, and if the received selection is to move down by d data tuples, the computer system generating a modification of the presentation by:
removing a last d data tuples from the second sub-sequence;
moving a last d data tuples from the first sub-sequence to be a first d data tuples in the second sub-sequence;
fetching and adding to the first sub-sequence a next d data tuples in the set of ordered data tuples that are less than a first data tuple in the first sub-sequence, so that the added next d data tuples are a new first d data tuples in the first sub-sequence; and
subsequent to the steps of removing the last d data tuples from the second sub-sequence, moving the last d data tuples from the first sub-sequence, and fetching and adding to the first sub-sequence the next d data tuples, creating the modification of the presentation having the one portion and the other portion, so that the first sub-sequence is in the one portion of the presentation, the second sub-sequence is in the other portion of the presentation and the search tuple is between the one portion and the other portion.

11. The computer system of claim 10, wherein the method further comprises the steps of:
subsequent to the step of generating the modification of the presentation if the received selection is to move up by d data tuples or to move down by d data tuples, the computer system receiving a second selection to return the presentation to an original presentation that resulted from the step of generating the presentation of the search tuple and the sequence of data tuples; and
in response to the step of receiving the second selection, the computer system re-generating the presentation of the search tuple and the sequence of data tuples.

12. The computer system of claim 9, wherein the step of generating the presentation of the search tuple and the sequence of data tuples includes the step of generating the presentation so that no value in the first sub-sequence and no value in the second sub-sequence is required to have a closeness to any value of the k elements of the search tuple that is within a threshold amount.

13. A computer program product, comprising:
a computer-readable, tangible storage device; and
a computer-readable program code stored in the computer-readable, tangible storage device, the computer-readable program code containing instructions that are carried out by a central processing unit (CPU) of a computer system to implement a method of managing a set of data tuples, the method comprising the steps of:
the computer system receiving a search tuple including k elements, k is an integer and k≥1;
the computer system determining a comparison relation specifying an ordering of tuples, each tuple including k elements;
the computer system ordering the set of data tuples by using the comparison relation and based on value(s) of the k elements included in each data tuple and corresponding value(s) of the k elements included in the received search tuple;
based on the comparison relation, the computer system determining a placement of the search tuple between two consecutive data tuples in the ordered set of data tuples, so that (1) one of the two consecutive data tuples is closest, based on the comparison relation, to the search tuple among data tuple(s) in the ordered set of data tuples whose k elements includes one element whose value is less than a value of a corresponding one of the k elements included in the search tuple and the other one of the two consecutive data tuples is closest, based on the comparison relation, to the search tuple among other data tuple(s) in the ordered set of data tuples whose k elements have value(s) that are greater than or equal to the value(s) of the k elements included in the search tuple, or (2) the one of the two consecutive data tuples is closest, based on the comparison relation, to the search tuple among data tuple(s) in the ordered set of data tuples whose k elements have value(s) that are less than or equal to the value(s) of the k elements included in the search tuple and the other one of the two consecutive data tuples is closest, based on the comparison relation, to the search tuple among other data tuple(s) in the ordered set of data tuples whose k elements includes one element whose value is greater than a value of a corresponding one of the k elements included in the search tuple; and
based on the placement of the search tuple between the two consecutive data tuples, the computer system generating a presentation of the search tuple and a sequence of data tuples included in the ordered set of data tuples so that the search tuple is displayed between first and second sub-sequences of the sequence of data tuples, the first sub-sequence including the one of the two consecutive data tuples, and the second sub-sequence including the other one of the two consecutive data tuples.

14. The program product of claim 13, wherein the method further comprises the steps of:
  subsequent to the step of the computer system generating the presentation, the computer system receiving a selection to (1) move the presentation up through the ordered set of data tuples by d data tuples (move up by d data tuples) or (2) move the presentation down through the ordered set of data tuples by d data tuples (move down by d data tuples), d is an integer and d≥1;
  in response to the step of receiving the selection, and if the received selection is to move up by d data tuples, the computer system generating a modification of the presentation by:
    removing a first d data tuples from the first sub-sequence;
    moving a first d data tuples from the second sub-sequence to be a last d data tuples in the first sub-sequence;
    fetching and adding to the second sub-sequence a next d data tuples in the set of ordered data tuples that are greater than a last data tuple in the second sub-sequence, so that the added next d data tuples are a new last d data tuples in the second sub-sequence; and
    subsequent to the steps of removing the first d data tuples from the first sub-sequence, moving the first d data tuples from the second sub-sequence, and fetching and adding to the second sub-sequence the next d data tuples, creating the modification of the presentation having one portion and another portion, so that the first sub-sequence is in the one portion of the presentation, the second sub-sequence is in the other portion of the presentation and the search tuple is between the one portion and the other portion; and
  in response to the step of receiving the selection, and if the received selection is to move down by d data tuples, the computer system generating a modification of the presentation by:
    removing a last d data tuples from the second sub-sequence;
    moving a last d data tuples from the first sub-sequence to be a first d data tuples in the second sub-sequence;
    fetching and adding to the first sub-sequence a next d data tuples in the set of ordered data tuples that are less than a first data tuple in the first sub-sequence, so that the added next d data tuples are a new first d data tuples in the first sub-sequence; and
    subsequent to the steps of removing the last d data tuples from the second sub-sequence, moving the last d data tuples from the first sub-sequence, and fetching and adding to the first sub-sequence the next d data tuples, creating the modification of the presentation having the one portion and the other portion, so that the first sub-sequence is in the one portion of the presentation, the second sub-sequence is in the other portion of the presentation and the search tuple is between the one portion and the other portion.

15. The program product of claim 14, wherein the method further comprises the steps of:
  subsequent to the step of generating the modification of the presentation if the received selection is to move up by d data tuples or to move down by d data tuples, the computer system receiving a second selection to return the presentation to an original presentation that resulted from the step of generating the presentation of the search tuple and the sequence of data tuples; and
  in response to the step of receiving the second selection, the computer system re-generating the presentation of the search tuple and the sequence of data tuples.

16. The program product of claim 13, wherein the step of generating the presentation of the search tuple and the sequence of data tuples includes the step of generating the presentation so that no value in the first sub-sequence and no value in the second sub-sequence is required to have a closeness to any value of the k elements of the search tuple that is within a threshold amount.

17. A process for supporting computing infrastructure, the process comprising the step of:
  a first computer system providing at least one support service for at least one of creating, integrating, hosting, maintaining, and deploying computer-readable code in a second computer system, the computer-readable code containing instructions, wherein the instructions, when carried out by a processor of the second computer system, implement a method of managing a set of data tuples, the method comprising the steps of:
    the second computer system receiving a search tuple including k elements, k is an integer and k≥1;
    the second computer system determining a comparison relation specifying an ordering of tuples, each tuple including k elements;
    the second computer system ordering the set of data tuples by using the comparison relation and based on value(s) of the k elements included in each data tuple and corresponding value(s) of the k elements included in the received search tuple;
    based on the comparison relation, the second computer system determining a placement of the search tuple between two consecutive data tuples in the ordered set of data tuples, so that (1) one of the two consecutive data tuples is closest, based on the comparison relation, to the search tuple among data tuple(s) in the ordered set of data tuples whose k elements includes one element whose value is less than a value of a corresponding one of the k elements included in the search tuple and the other one of the two consecutive data tuples is closest, based on the comparison relation, to the search tuple among other data tuple(s) in the ordered set of data tuples whose k elements have value(s) that are greater than or equal to the value(s) of the k elements included in the search tuple, or (2) the one of the two consecutive data tuples is closest, based on the comparison relation, to the search tuple among data tuple(s) in the ordered set of data tuples whose k elements have value(s) that are less than or equal to the value(s) of the k elements included in the search tuple and the other one of the two consecutive data tuples is closest, based on the comparison relation, to the search tuple among other data tuple(s) in the ordered set of data tuples whose k elements includes one element whose value is greater than a value of a corresponding one of the k elements included in the search tuple; and
    based on the placement of the search tuple between the two consecutive data tuples, the second computer system generating a presentation of the search tuple and a sequence of data tuples included in the ordered set of data tuples so that the search tuple is displayed between first and second sub-sequences of the sequence of data tuples, the first sub-sequence including the one of the two consecutive data tuples, and the second sub-sequence including the other one of the two consecutive data tuples.

18. The process of claim 17, wherein the method further comprises the steps of:
subsequent to the step of the second computer system generating the presentation, the second computer system receiving a selection to (1) move the presentation up through the ordered set of data tuples by d data tuples (move up by d data tuples) or (2) move the presentation down through the ordered set of data tuples by d data tuples (move down by d data tuples), d is an integer and d≥1;
in response to the step of receiving the selection, and if the received selection is to move up by d data tuples, the second computer system generating a modification of the presentation by:
removing a first d data tuples from the first sub-sequence;
moving a first d data tuples from the second sub-sequence to be a last d data tuples in the first sub-sequence;
fetching and adding to the second sub-sequence a next d data tuples in the set of ordered data tuples that are greater than a last data tuple in the second sub-sequence, so that the added next d data tuples are a new last d data tuples in the second sub-sequence; and
subsequent to the steps of removing the first d data tuples from the first sub-sequence, moving the first d data tuples from the second sub-sequence, and fetching and adding to the second sub-sequence the next d data tuples, creating the modification of the presentation having one portion and another portion, so that the first sub-sequence is in the one portion of the presentation, the second sub-sequence is in the other portion of the presentation and the search tuple is between the one portion and the other portion; and
in response to the step of receiving the selection, and if the received selection is to move down by d data tuples, the second computer system generating a modification of the presentation by:
removing a last d data tuples from the second sub-sequence;
moving a last d data tuples from the first sub-sequence to be a first d data tuples in the second sub-sequence;
fetching and adding to the first sub-sequence a next d data tuples in the set of ordered data tuples that are less than a first data tuple in the first sub-sequence, so that the added next d data tuples are a new first d data tuples in the first sub-sequence; and
subsequent to the steps of removing the last d data tuples from the second sub-sequence, moving the last d data tuples from the first sub-sequence, and fetching and adding to the first sub-sequence the next d data tuples, creating the modification of the presentation having the one portion and the other portion, so that the first sub-sequence is in the one portion of the presentation, the second sub-sequence is in the other portion of the presentation and the search tuple is between the one portion and the other portion.

19. A method of managing a data set, the method comprising the steps of:
a computer receiving a search tuple that includes k values;
the computer receiving one or more parameters specifying how many data tuples to fetch from the data set so that a presentation of a sequence of data tuples included in the data set fits on a single page for viewing by a user;
the computer receiving a comparison relation specifying an ordering of data tuples included in the data set, the ordering based on the k values included in the search tuple;
based on the comparison relation and based on the k values, the computer ordering the data set by ordering all the data tuples included in the data set;
the computer determining a data tuple included in the ordered data set is a closest match to the search tuple based on the k values; and
the computer fetching the sequence of ordered data tuples from the ordered data set so that the sequence includes m ordered data tuples and n ordered data tuples, m≥1, n≥1, and the step of fetching the sequence of ordered data tuples including:
fetching the closest match from the ordered data set;
fetching the m ordered data tuples closest to and less than the closest match in the ordered data set, the m ordered data tuples being fetched based on the received one or more parameters without requiring any of the m ordered data tuples to have a closeness to the closest match or to the search tuple that is within a threshold value; and
fetching the n ordered data tuples closest to and greater than or equal to the closest match in the ordered data set, the n ordered data tuples being fetched based on the received one or more parameters without requiring any of the n ordered data tuples to have the closeness to the closest match or to the search tuple that is within the threshold value; and
the computer generating the presentation on the single page for viewing by the user, the presentation having first, second and third portions, so that the m ordered data tuples are included in the first portion of the presentation, the n ordered data tuples are included in the second portion of the presentation, and the closest match is included in the third portion of the presentation.

20. The method of claim 19, further comprising the computer providing a search form, wherein the step of receiving the search tuple that includes the k values includes receiving the k values in entry fields of the search form, and wherein the step of generating the presentation includes generating the presentation on the single page so that the search form is between the first and second portions in the presentation, and so that the third portion including the closest match is between the first and second portions in the presentation.

21. The method of claim 20, further comprising the steps of:
subsequent to the step of generating the presentation, the computer receiving a value in the search form, the received value being a new value in the search tuple or an updated value included in the search tuple;
based in part on the received value, the computer determining another data tuple included in the ordered data set is a new closest match to the search tuple that includes the received value;
the computer fetching another sequence of ordered data tuples from the ordered data set by fetching from the ordered data set the new closest match, another m ordered data tuples closest to and less than the new closest match in the ordered data set, and another n ordered data tuples closest to and greater than or equal to the new closest match in the ordered data set; and the computer updating the presentation on the single page for viewing by the user, the updated presentation having the first, second and third portions, so that the other m ordered data tuples are included in the first portion of the updated presentation, the other n ordered data tuples are included in the second portion of the updated presentation, and the new closest match is included in the third portion of the updated presentation, without requiring that any of the data tuples in the updated presentation match the search tuple and without requiring that any of the data tuples in the updated presentation have the closeness within the threshold value.

* * * * *